(12) United States Patent
Copeland et al.

(10) Patent No.: US 10,663,095 B2
(45) Date of Patent: May 26, 2020

(54) RESTRAINED GASKET FOR PLASTIC PIPES

(71) Applicant: McWane, Inc., Birmingham, AL (US)

(72) Inventors: Daniel A. Copeland, Bessemer, AL (US); Michael C. Keel, Birmingham, AL (US)

(73) Assignee: McWane, Inc., Birmingham, AL (US)

( * ) Notice: Subject to any disclaimer, the term of this patent is extended or adjusted under 35 U.S.C. 154(b) by 329 days.

(21) Appl. No.: 15/683,057

(22) Filed: Aug. 22, 2017

(65) Prior Publication Data

US 2017/0370505 A1 Dec. 28, 2017

Related U.S. Application Data

(63) Continuation-in-part of application No. 15/151,932, filed on May 11, 2016, now Pat. No. 10,288,199, and a continuation-in-part of application No. 15/263,543, filed on Sep. 13, 2016, and a continuation-in-part of application No. 29/607,895, filed on Jun. 16, 2017, now Pat. No. Des. 834,690, and a continuation-in-part of application No. 29/610,412, filed on Jul. 12, 2017, now Pat. No. Des. 857,859, and a continuation-in-part of application No. 29/610,414, filed on Jul. 12, 2017, now Pat. No. Des. 846,095.

(51) Int. Cl.
| | | |
|---|---|---|
| F16L 47/08 | (2006.01) | |
| F16L 21/035 | (2006.01) | |
| F16L 21/00 | (2006.01) | |
| F16L 21/08 | (2006.01) | |
| F16J 15/12 | (2006.01) | |
| F16L 37/084 | (2006.01) | |

(52) U.S. Cl.
CPC ........... *F16L 21/035* (2013.01); *F16J 15/121* (2013.01); *F16L 21/007* (2013.01); *F16L 21/08* (2013.01); *F16L 37/0845* (2013.01); *F16L 47/08* (2013.01)

(58) Field of Classification Search
CPC ........ F16L 37/0845; F16L 47/08; F16L 21/02
See application file for complete search history.

(56) References Cited

U.S. PATENT DOCUMENTS

| | | | | |
|---|---|---|---|---|
| 2,230,725 A * | 2/1941 | Nathan | ............... | F16L 37/0845 277/624 |
| 5,094,467 A * | 3/1992 | Lagabe | ............... | F16L 37/0845 277/616 |
| 5,219,189 A * | 6/1993 | Demoisson | ......... | F16L 37/0845 285/105 |

(Continued)

*Primary Examiner* — David Bochna
(74) *Attorney, Agent, or Firm* — C. Brandon Browning; Maynard, Cooper & Gale, PC

(57) ABSTRACT

A gasket for preventing the separation of a pipe joint formed between plastic pipes such as pipes manufactured from PVC. The invention provides an internally restrained pipe joint including a bell with a substantially V-shaped annular groove. The annular groove includes a front radial wall and a rear radial wall and a gasket seated in the annular groove. The gasket includes an inner radial face, an opening defined by the inner radial face and an outer radial face with a front radial section located adjacent to the front radial wall of the annular groove and a rear radial section located adjacent to the rear radial wall of the annular groove. A plurality of toothed, rigid restraining segments is at least partially embedded in the gasket.

21 Claims, 6 Drawing Sheets

(56) References Cited

U.S. PATENT DOCUMENTS

| | | | | |
|---|---|---|---|---|
| 5,295,697 | A * | 3/1994 | Weber | F16L 37/0845 |
| | | | | 277/616 |
| 5,464,228 | A * | 11/1995 | Weber | F16L 37/0845 |
| | | | | 277/615 |
| 6,688,652 | B2 * | 2/2004 | Holmes, IV | F16L 37/0845 |
| | | | | 285/105 |
| 7,284,310 | B2 | 10/2007 | Jones et al. | |
| 7,401,791 | B2 | 7/2008 | Andrick et al. | |
| 7,461,868 | B2 * | 12/2008 | Allen | F16L 37/0845 |
| | | | | 285/104 |
| 7,784,798 | B2 | 8/2010 | Walworth et al. | |
| 7,815,225 | B2 | 10/2010 | Jones et al. | |
| 7,845,686 | B2 | 12/2010 | Steinbruck | |
| 8,235,427 | B2 | 8/2012 | Jones et al. | |
| 8,444,186 | B2 | 5/2013 | Jones et al. | |
| 8,490,273 | B1 | 7/2013 | Copeland et al. | |
| 8,511,690 | B2 | 8/2013 | Holmes, IV et al. | |
| 8,511,691 | B2 | 8/2013 | Holmes, IV et al. | |
| 8,533,926 | B2 | 9/2013 | Holmes, IV et al. | |
| 8,544,851 | B2 | 10/2013 | Holmes, IV et al. | |
| 8,857,861 | B2 * | 10/2014 | German | F16L 37/0845 |
| | | | | 285/105 |
| 8,870,188 | B2 | 10/2014 | Holmes, IV et al. | |
| 9,057,467 | B2 | 6/2015 | Copeland et al. | |
| 9,400,071 | B1 * | 7/2016 | Copeland | F16L 37/0845 |
| 9,400,073 | B2 | 7/2016 | Lopez-Chaves | |
| 9,435,471 | B1 * | 9/2016 | Copeland | F16L 37/0845 |
| 9,593,787 | B2 | 3/2017 | Monteil et al. | |
| 2008/0018104 | A1 * | 1/2008 | Walworth | F16L 37/0845 |
| | | | | 285/232 |
| 2010/0078937 | A1 | 4/2010 | Jones et al. | |
| 2010/0225111 | A1 | 9/2010 | Owen | |
| 2012/0025471 | A1 | 2/2012 | Andrick et al. | |
| 2013/0043656 | A1 * | 2/2013 | Copeland | F16L 37/0845 |
| | | | | 277/314 |
| 2014/0339773 | A1 | 11/2014 | Holmes, IV et al. | |
| 2014/0374994 | A1 * | 12/2014 | Monteil | F16L 37/0845 |
| | | | | 277/314 |
| 2015/0204468 | A1 * | 7/2015 | Jones | F16L 37/0845 |
| | | | | 285/110 |
| 2016/0245436 | A1 | 8/2016 | Monteil | |
| 2017/0114933 | A1 * | 4/2017 | Copeland | F16L 37/0845 |
| 2017/0328503 | A1 * | 11/2017 | Copeland | F16L 37/0845 |
| 2017/0370505 | A1 * | 12/2017 | Copeland | F16L 37/0845 |
| 2019/0162342 | A1 * | 5/2019 | Copeland | F16L 37/0845 |

* cited by examiner

RESTRAINED GASKET FOR PLASTIC PIPES

RELATED APPLICATIONS

This application claims priority to U.S. application Ser. No. 15/151,932, filed on May 11, 2016 and titled, "Restrained Plastic Pipe Joint and Method of Making Same," which issued on May 14, 2019 as U.S. Pat. No. 10,288,199, U.S. application Ser. No. 15/263,543, filed on Sep. 13, 2016 and titled "Restrained Plastic Pipe Joint and Method of Making Same," which issued on Oct. 8, 2019, as U.S. Pat. No. 10,436,359, U.S. application Ser. No. 29/607,895, filed on Jun. 16, 2017 and titled, "Gasket Locking Segment Having Single Spigot Tooth," which issued on Nov. 27, 2018, as U.S. Pat. No. D834,690, U.S. application Ser. No. 29/610,414, filed on Jul. 12, 2017 and titled, "Restrained Gasket," which issued on Apr. 16, 2019, as U.S. Pat. No. D846,095, and U.S. application Ser. No. 29/610,412, filed on Jul. 12, 2017 and titled "Inner Surface of Restrained Gasket," which issued on Aug. 27, 2019, as U.S. Pat. No. D857,859 the entire contents of which are incorporated herein by reference.

FIELD OF THE INVENTION

The present invention is directed to a pipe gasket and, more particularly, to a restrained pipe gasket for restraining a spigot of a first plastic pipe within a bell of a second plastic pipe, the pipe gasket including rigid locking segments configured for decreasing the force required to insert the spigot into the bell while preventing separation there between.

BACKGROUND OF THE INVENTION

Pipe joint gaskets including anti-slip segments for preventing the separation of interconnected, telescoping metal pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced around its inner perimeter. The toothed metal segments bite into the outer surface of the spigot of the inserted pipe and prevent withdrawal of the inserted pipe from a bell end of the other pipe, which can be caused by unbalanced hydrostatic or hydrodynamic forces. Hydrostatic and hydrodynamic forces that are unbalanced within a pipeline are referred to as thrust forces. Thrusts occur whenever there is a change in the direction of flow within a pipeline or the cross-sectional area of the pipeline. A shortcoming of restrained gaskets is that during fluid pressurization of the interconnected pipes, excessive axial thrust force generated by the resulting hydrostatic pressure can cause the acutely pointed, metal segments to exert destructive radial loads upon the inner axial surface of the bell end and the outer axial surface of the spigot end. In many instances, these radial loads are great enough to fracture the spigot and bell ends of the metal pipes.

Since toothed, anti-slip segments are known to destructively impinge upon metal pipes, the use of gaskets containing such or similar segments for preventing the separation of interconnected plastic pipes has been limited, especially in high pressure applications. Instead, plastic pipes, such as those formed from thermoplastic materials including polyethylene, polybutylene, polypropylene and poly(vinyl chloride) or PVC, are typically joined together by means of a bell-and-spigot gasket-sealed joint utilizing self-restrained gaskets often referred to as Rieber gaskets. A Rieber gasket consists of a continuous steel band either externally or internally bonded to an elastomer annular body. The Rieber gasket is locked into place within an annular groove of the bell, and the toothless, steel band functions to prevent the gasket from becoming dislodged therefrom. The Rieber gasket fails however to sufficiently restrain axial separation of plastic pipes along a joint upon fluid pressurization of, or the occurrence of thrust forces within, the pipe joint at high pressure. Consequently, to restrain plastic pipes, external harness and other mechanical joint type glands must be used.

U.S. Pat. No. 9,400,073 describes a restrained pipe seal for sealing a joint between plastic pipes. The seal includes a plastic carrier member and a sealing member attached to the carrier member. The plastic carrier member includes retaining inserts for gripping a spigot of one pipe and a bell of another pipe for holding the pipes together against thrust forces, the inserts including multiple spigot teeth. Shortcomings of the pipe seal include both difficulty and expense related to manufacturing the seal. These shortcomings arise from requirements that the plastic carrier be made separately from the sealing member and then loaded into a rubber mold along with the retaining inserts. Further, the plastic carrier must also be of a sufficiently tough material to resist the heat of the gasket manufacturing process (vulcanizing process) which further increases the cost. Additionally, if the material of the plastic carrier is too inelastic, insertion of the pipe seal into a pipe bell may be prohibited.

SUMMARY OF THE INVENTION

The present invention is directed to a gasket for preventing the separation of a pipe joint formed between plastic pipes such as pipes manufactured from PVC. The invention is based upon the discovery that gaskets containing toothed, metal locking segments can form seals between joined plastic pipes and prevent separation of the pipes caused by thrust forces without the metal segments destructively impinging upon the pipes. The invention is further based upon the discovery that such gaskets allow for hand assembly of restrained plastic pipe joints and the retrofitting of Rieber gasket-containing plastic bells with internally restrained gaskets.

According to one aspect of the invention there is provided a pipe gasket for restraining a spigot of a first plastic pipe within a bell of a second plastic pipe, the pipe gasket including a compressible annular body and a plurality of rigid segments partially embedded within the compressible annular body. At least one of the rigid segments has an axially extending, radially inward facing, exposed surface, i.e., a surface not covered by material of the compressible annular body, defining a unitary, acutely pointed spigot tooth and including opposing lateral edges, a proximal edge, a distal edge and a flat portion that extends to and between the distal edge and the unitary spigot tooth and to and between the opposing lateral edges. The unitary spigot tooth extends along the proximal edge and projects radially inward from an inner annular surface of the compressible annular body. The unitary spigot tooth provides the only spigot penetrating portion of the rigid segment. At least one bell tooth extends axially from an outer, embedded surface of the segment, the bell tooth being configured to engage and impinge upon the bell end of the second pipe.

In use, the pipe gasket is seated into the bell, and the spigot is inserted into the bell and through an opening defined by the inward facing annular surface of the compressible annular body whereby the spigot directly contacts and slides across the flat portion of the inward facing exposed surface of the rigid segment from about the distal edge of the exposed surface to the unitary spigot tooth. The exposed flat portion serves to substantially decrease the insertion force required to push the spigot into the bell and through the pipe gasket compared to present plastic pipe gaskets, such as Rieber gaskets, which include an inward facing annular surface composed entirely of a rubber. This is because rubber has a kinetic frictional coefficient with respect to plastics, in general, that is greater than that of steel or other metals. The locking segment and gasket design of the present invention therefore allows for hand assembly of restrained plastic pipe joints without the need for additional machines or equipment. Upon pressurization of the pipes or the realization of thrust forces, the unitary spigot tooth impinges non-destructively upon the spigot and the at least one bell tooth impinges non-destructively upon the bell thereby locking the pipes together.

According to another aspect of the invention, there is provided a pipe gasket for restraining a spigot of a first plastic pipe within a bell of a second plastic pipe, the pipe gasket including a ring fabricated from a compressible material, the ring having an inner annular surface and an outer annular outer surface, a void within the ring, a first opening extending through the inner annular surface and into the void and a restraining segment seated within the void. The restraining segment includes a unitary spigot tooth extending radially inward from a proximal edge of the restraining segment and a flat portion extending distally from the unitary spigot tooth to a distal edge of the restraining segment, the flat portion being essentially flush with the inner annular surface. A second opening is formed within the ring that extends through the outer annular surface and into a second void. At least one bell tooth of the restraining segment is located within or adjacent to the second opening. The second opening is configured to receive compressible material of the ring that is displaced by the engagement of the at least one bell tooth with the bell and pressing of the ring against bell.

According to another aspect of the invention, there is provided a pipe gasket for restraining a spigot of a first plastic pipe within a bell of a second plastic pipe, the pipe gasket including a compressible body having an inner annular surface, an outer annular outer surface and a first opening in the inner annular surface, the first opening having opposing lateral edge portions, a proximal edge portion and a distal edge potion. A restraining segment is partially embedded within the compressible body, the restraining segment having a first face that extends to and between the opposing lateral edge portions and to and between the proximal edge portion and the distal edge portion of the first opening. The first face defines a unitary spigot tooth extending along the proximal edge portion of the first opening and includes a substantially flat portion that is flush with the inner annular surface and extends distally from the single spigot tooth to the distal edge portion of the first opening.

According to yet another aspect of the invention, there is provided a method of restraining a spigot of a first plastic pipe within a bell of a second plastic pipe. The method includes providing a pipe gasket including rigid locking segments, at least one of the locking segments including an acutely pointed bell tooth, an acutely pointed spigot tooth and a flat surface extending to and between the spigot tooth and a distal edge of the at least on locking segment, and seating the pipe gasket into an annular groove of the bell. The spigot is then inserted by hand, without the aid of a powered machine, into the bell and through an opening defined by the pipe gasket. Upon pressurization of the pipes, the spigot tooth impinges upon the spigot and the bell tooth upon the bell thereby locking the pipes together. In certain instances, the pipe gasket can be used to convert a plastic pipe bell containing a self-restraining gasket, such as a Rieber gasket, wherein the gasket provides insufficient joint restraint, thus requiring the use of external harness restraints, to a plastic pipe bell including a sufficiently, internally restrained joint, thus requiring no external harness restraints.

DETAILED DESCRIPTION OF THE INVENTION

Figure 1:
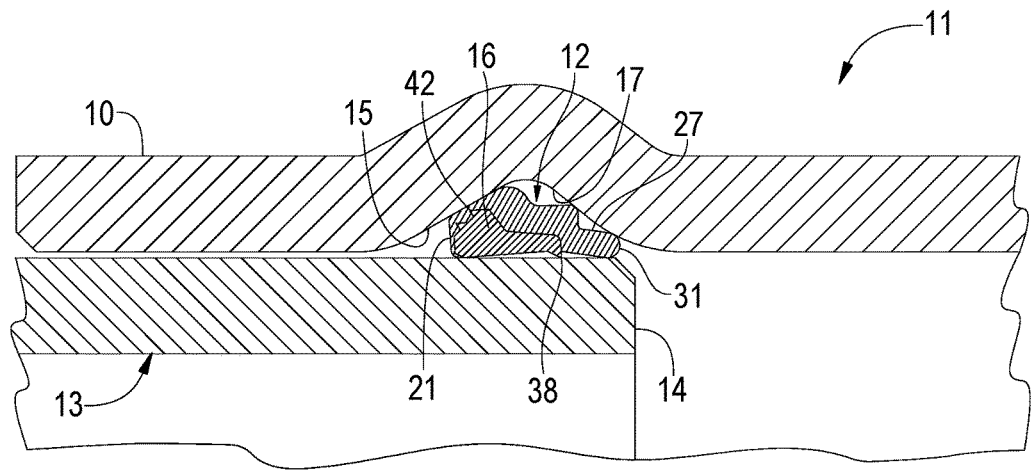
FIG. 1 is a fragmented sectional view of a bell of a first plastic pipe containing a restrained pipe gasket in accordance with the present invention showing initial insertion of a spigot of a second plastic pipe into the bell and through the pipe gasket.

The present invention is directed to a pipe gasket that is adapted and arranged for forming a sealed and restrained joint between plastic pipes. Generally, the pipe joint includes a bell end 10 of a first plastic pipe 11, a gasket 12 seated within an inner annular groove or retainer groove of bell end 10 and a spigot end 14 of a second plastic pipe 13 inserted through gasket 12, gasket 12 forming a seal between pipes 11 and 13. Toothed locking segments 16 are embedded within and circumferentially arranged around gasket 12. Locking segments 16 are arranged to impinge upon pipes 11 and 13 upon pressurization of, or the occurrence of thrust forces within, the pipe joint thereby restraining axial movement of spigot end 14 out of bell end 10. The foregoing is accomplished without the use of a joint gasket gland, a Rieber gasket or an external harness.

More particularly, as illustrated in FIG. 1, the inner surface of bell end 10 includes an annular retainer groove defined by a front radial wall 15 and a rear radial wall 17 of the inner surface which intersect to provide the retainer groove with a substantially V-shaped or U-shaped cross-section. The annular groove of bell end 10 can be formed by any means known in the art for forming bell ends in plastic pipes including extruding first plastic pipe 13 over a mandrel having a Rieber gasket disposed thereon and removing the first plastic pipe from the mandrel with the Rieber gasket located in the annular groove, for example, as described in U.S. application Ser. No. 14/817,923, the entire contents of which are incorporated herein by reference. Thereafter, the Rieber gasket is removed by hand, for example, with the aid of pry bar to provide an empty annular retainer groove.

Gasket 12 is positioned within the retainer groove with a front outer face 20 thereof being arranged adjacent to and, in sealing engagement with, front radial wall 15 and a rear outer face 22 thereof being arranged adjacent to and, in sealing engagement with, rear radial wall 17. Thus, it is contemplated that the gasket of the present invention can be used to retrofit existing plastic pipe bells which contain Rieber gaskets or other similar, self-restrained gaskets thereby converting the joints formed by the plastic pipe bells from internally unrestrained joints to internally restrained joints.

Gasket 12 is composed of an annular rubber body including a front portion having a substantially V-shaped outer surface defined by an annular front outer face 20 and an annular rear outer face 22 and a smooth inner surface defined by an annular inner face 24. Front outer face 20 and inner face 24 are joined by an annular leading face 21 which forms a front-most edge of gasket 12.

Annular rubber body further includes a middle portion having an L-shaped outer surface defined by an annular horizontal outer face 23 extending rearward from rear outer face 22 and an annular vertical outer face 25 extending radially inward from horizontal face 23. The middle portion further includes a smooth, annular inner surface defined by inner face 24.

Additionally, the annular rubber body includes an annular lip portion 27 which extends slightly radially inward from vertical outer face 25 of the middle portion. Lip portion 27 forms an annular inner surface 29 that is contiguous with inner face 24 and defines a variable circumference or diameter which progressively decreases moving from inner face 24 to a free end 31 of lip portion 27. The variable diameter serves to improve sealing between the gasket and the spigot end of the second pipe since, at its smallest diameter, the diameter of annular inner surface 29 of lip portion 27 is substantially less than the diameter of annular inner face 24 of the gasket. Consequently, inner surface 29 of lip portion 27 forms a tighter seal about the spigot end than does inner face 24 portion of the gasket.

Figure 3:
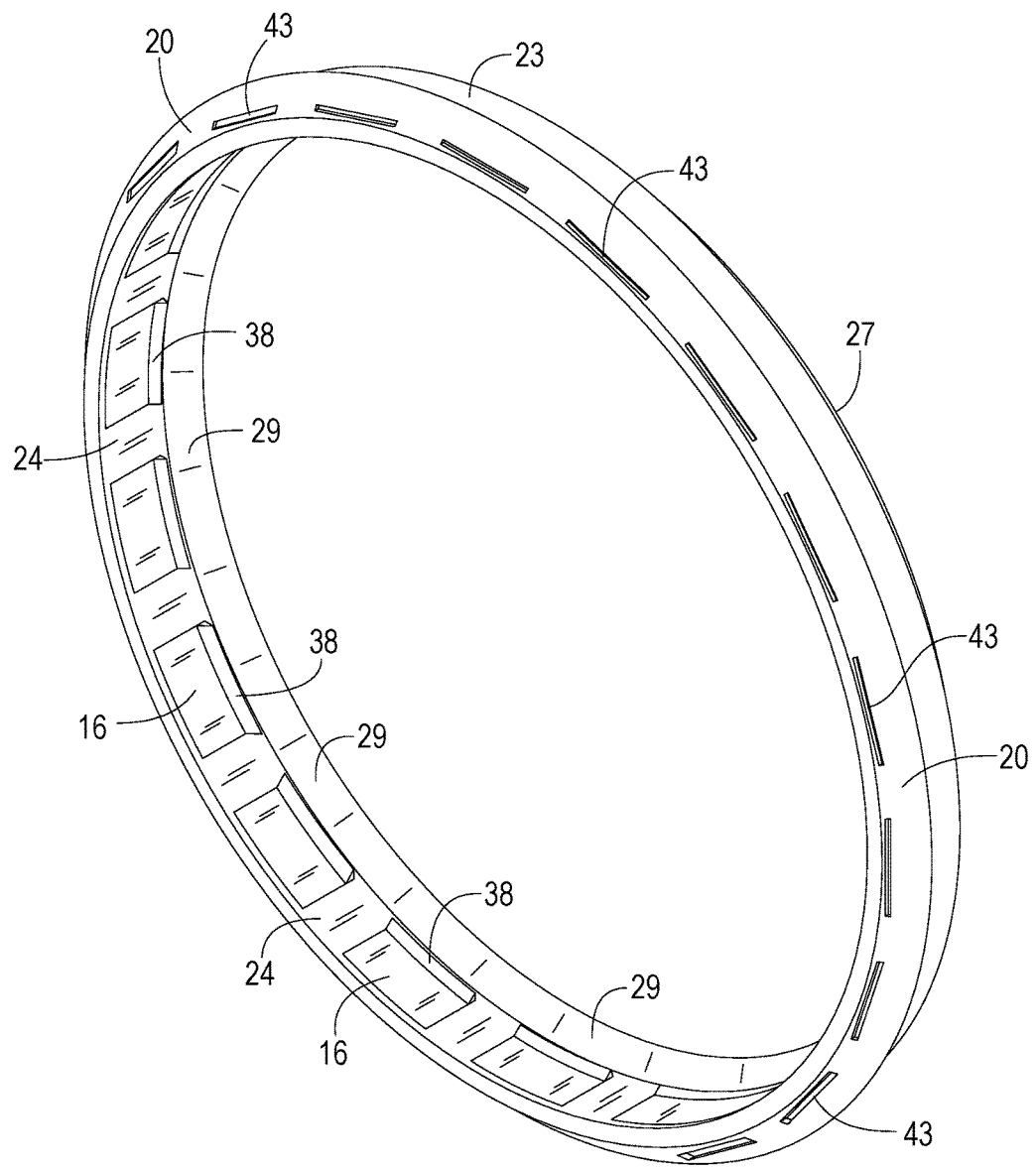
FIG. 3 is a perspective view the pipe gasket of FIG. 1 showing the placement of locking segments around its periphery.
Figure 4:
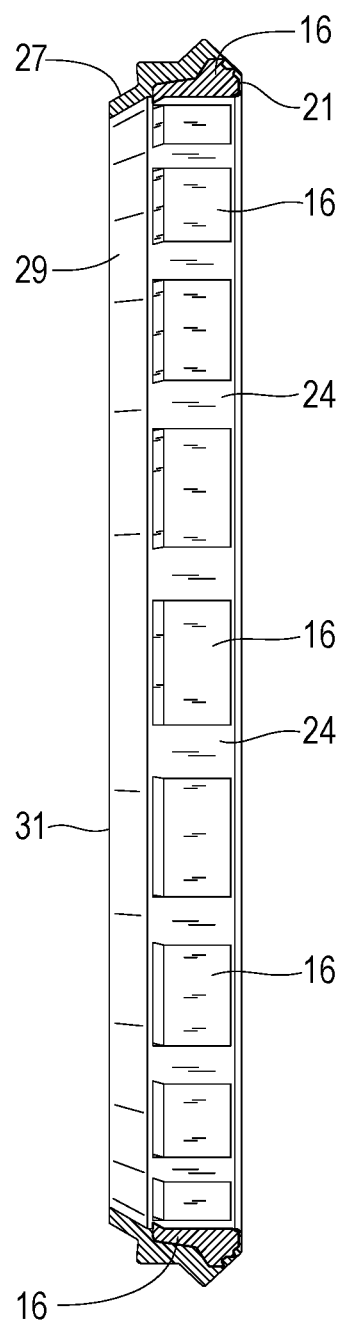
FIG. 4 is a sectional view of the pipe gasket of FIG. 1.
Figure 5:
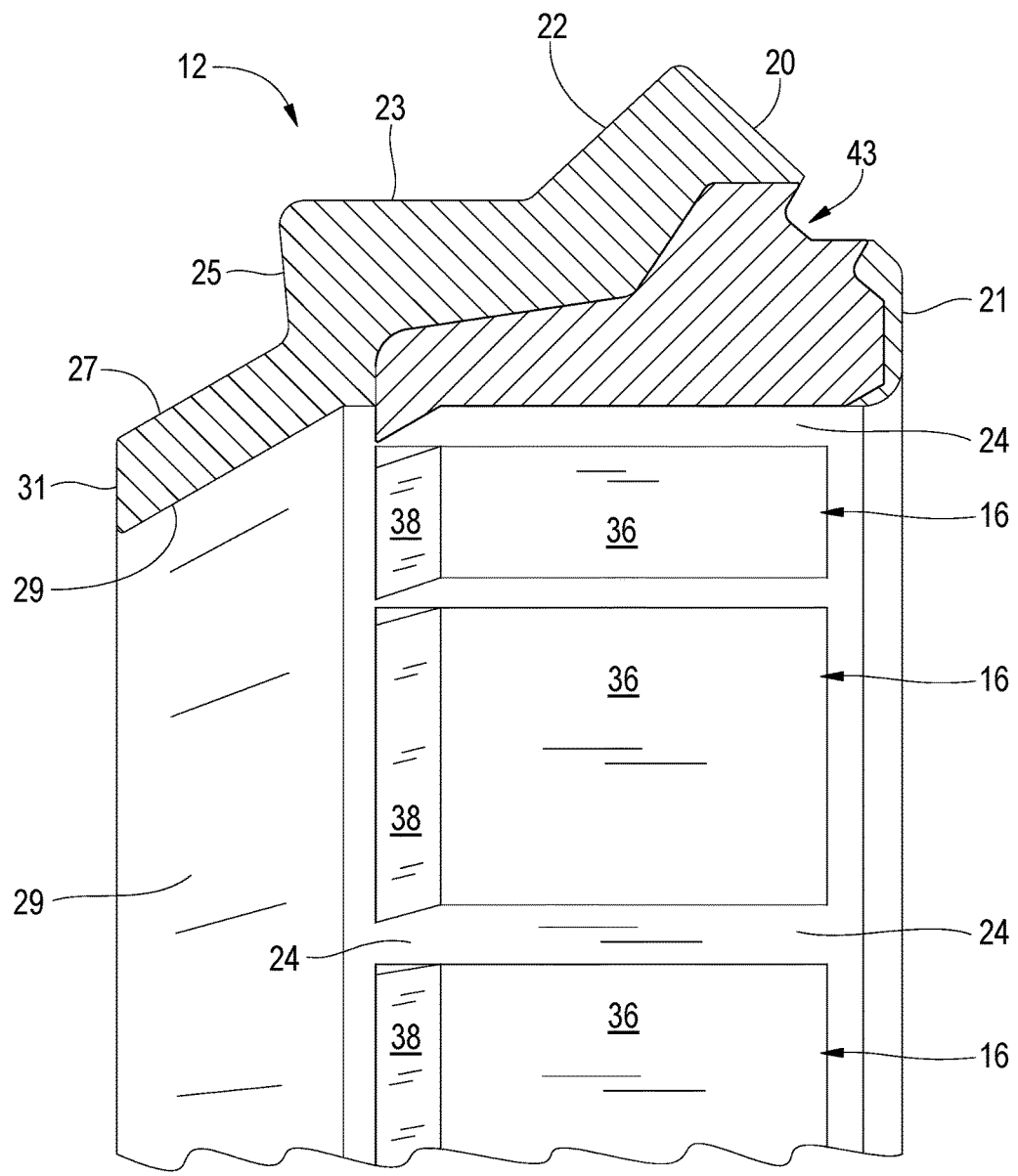
FIG. 5 is a fragmented sectional view of the pipe gasket of FIG. 1.
Figure 6:
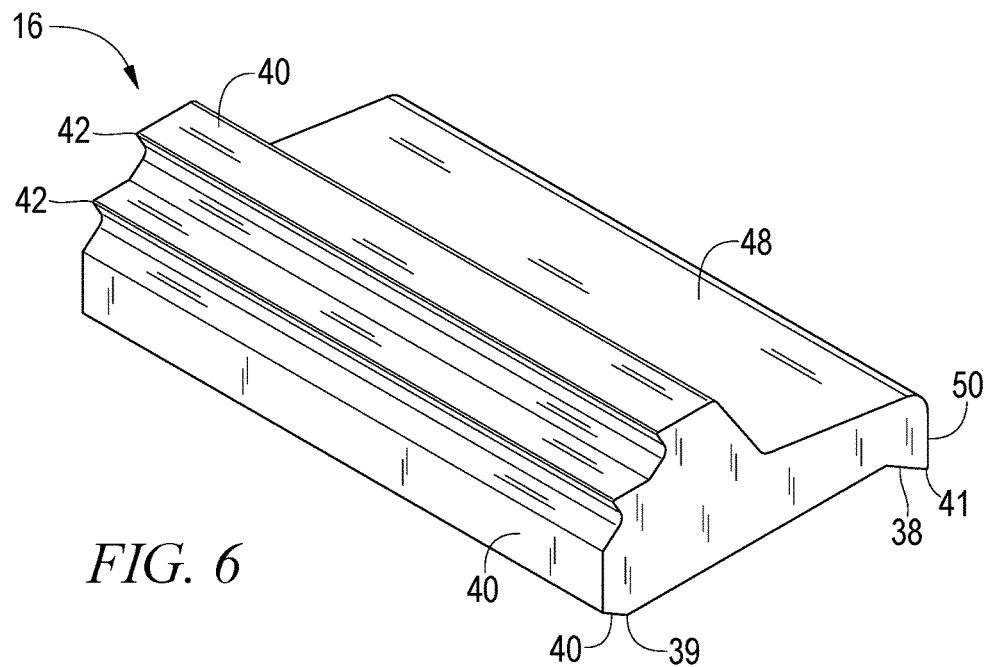
FIG. 6 is a front perspective view of one of the locking segments of FIG. 1.
Figure 7:
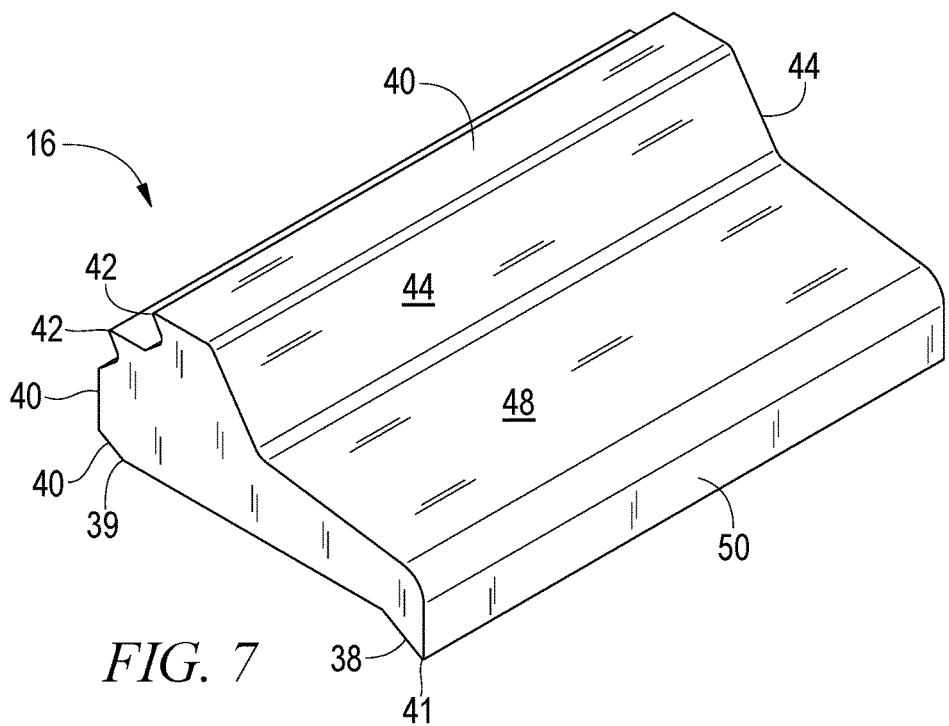
FIG. 7 is a rear perceptive view of the locking segment of FIG. 6.
Figure 8:
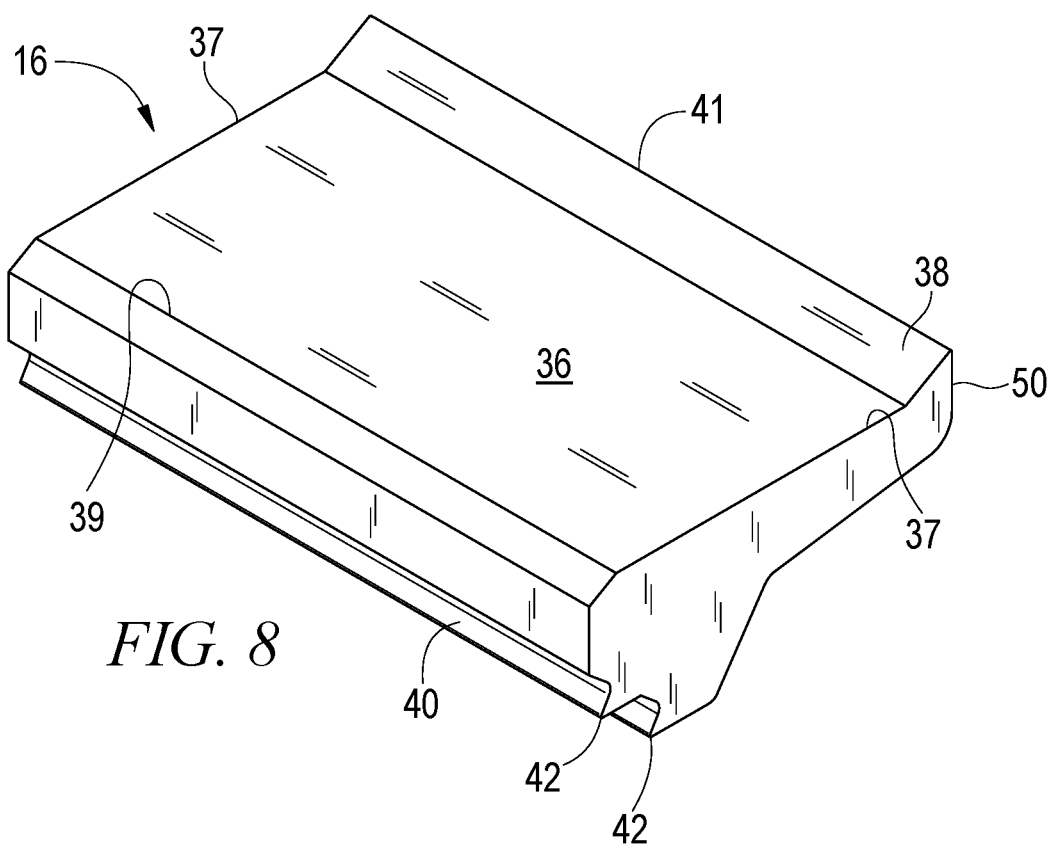
FIG. 8 is a perspective view of a bottom of the locking segment of FIG. 6.
Figure 9:
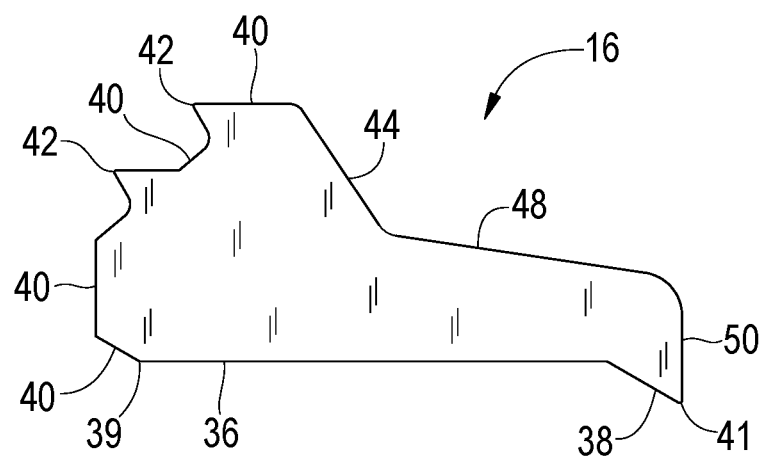
FIG. 9 is an elevation view of a lateral side of the locking segment of FIG. 6.

Inserted into gasket 12 are rigid locking segments 16. As depicted in FIG. 3, segments 16 are spaced apart equally in a circumferential direction around the periphery of gasket 12 and firmly vulcanized into grooves or voids found within inner face 24 of gasket 12. Each groove or void is accessible through a rectangular opening formed through inner face 24 of gasket 12, each opening having opposing lateral sides, a proximal side and a distal side. The number of locking segments 16 inserted into gasket 12 varies depending upon the anticipated fluid pressure at the pipe joint and the size of the plastic pipes involved. Although segments 16 are shown to be spaced apart equally, it is understood that the spacing can be unequal. For example, the segments can be grouped in tights clusters which are spaced from other tight segment clusters.

Referring to FIGS. 4 through 9, each segment 16 includes a rectangular shaped, inner surface 36 having a unitary, acutely pointed, spigot tooth 38 extending radially inward therefrom. Inner surface 36, which is not embedded within the rubber body of gasket 12, but rather is exposed, includes opposing lateral edges 37, a distal edge 39 and a proximal edge 41. Inner surface 36 includes a smooth, flat portion that is arranged flush or substantially flush with inner face 24 of gasket 12 with opposing lateral edges 37, distal edge 39 and proximal edge 41 being arranged adjacent to opposing lateral sides, distal side and proximal side, respectively, of the rectangular shaped opening through inner face 24. The smooth, flat portion extends to and between the opposing lateral edges 37 and to and between the spigot tooth and the distal edge 39. To maximize the flat surface area of the smooth, flat portion of inner surface 36, spigot tooth 38 is arranged to protrude radially inward from along or adjacent to proximal edge 41 of inner surface 36. It is contemplated that unitary tooth 38 may be slightly spaced apart from proximal edge 41 a short distance.

Each segment 16 further includes a front surface 40 that intersects flat inner surface 36 to form a forward-facing, multi-faced nose portion that extends from distal edge 39 to a top portion of the segment. Front surface 40 extends adjacent to and along front outer face 20 of gasket 12. Arranged radially outward of the nose portion along front outer face 40 are two rows of acutely pointed bell teeth 42 extending distally from front outer surface 40. Bell teeth 42 are configured for impinging upon radial wall 15. A rectangular-shaped space 43 is defined between the two rows of bell teeth 42 that is devoid of the rubber body of gasket 12. Space 43 provides a void, open to the surface of the gasket, into which the material of the annular rubber body can flow upon compression of the rubber against the bell and penetration of bell teeth 42 through the rubber.

In addition to inner surface 36 and front outer surface 40, each segment 16 includes a substantially L-shaped rear outer surface defined by a vertical surface 44, which extends proximally and radially inward from outer surface 40, and a horizontal surface 48, which extends proximally from vertical surface 44. Horizontal surface 48 intersects the distal-most surface 50 of segment 16 which forms a portion of spigot tooth 38. L-shaped surface is configured to maximize the mass and thickness of the proximal-most half of the annular rubber body of gasket 12 for improving the sealing performance of gasket 12.

Locking segments 16 are preferably fabricated from a metal such as steel and, more preferably, from a powdered metal such as powdered iron, powered low alloy steel or powdered alloyed steel. Locking segments 16 fabricated from powdered metal or metals can be formed by powder compaction, powder forging, hot isostatic pressing, metal injection molding, electric current assisted sintering or additive manufacturing including 3-D printing, selective laser melting and electron beam melting. A benefit of fabricating locking segments 16 from powdered metal is that powdered metal has lower manufacturing costs than other metal forming methods such as machining, casting or extruding/drawing. In certain instances, the segments fabricated from powdered metal can be formed in place by introducing powdered metal into the voids formed in inner face 24 of gasket 12 and hardening or compacting the metal while the metal is contained within the voids.

Referring to FIG. 1, the restrained, plastic pipe joint of the present invention is assembled by inserting spigot end 14 through an opening defined by inner surface 24 of gasket 12 by hand. A throat of bell end 10 guides spigot end 14 into bell end 10 until a beveled end of spigot end 14 contacts the smooth, flat inner portions of inner surfaces 36 near distal edges 39 of the segments 16. As spigot end 14 moves into bell end 10, the spigot end slides along the smooth, flat portions of inner surfaces 36 of the segments 16 before contacting the spigot teeth 38. As spigot end 14 continues to slide through gasket 12, spigot end 14 presses teeth 38 radially outward thereby causing segments 16 to move radially outward and compress the annular rubber body of gasket 14 between spigot end 14 and front radial wall 15 and a rear radial wall 17 of the annular retainer groove of bell end 10. This functions to prevent gasket 12 from dislodging from the retainer groove during further insertion of spigot end 14 into bell end 10, as well as form a seal between pipes 11 and 13. Since each spigot tooth 38 includes a tapered distal-edge, spigot end 14 slides across teeth 38 without the teeth impinging upon pipe 13, despite the compression of the rubber body of gasket 12. In part, that is because the contour of the outer surfaces of the segments relevant to contour of the inner surface of annular retainer groove provide for an annular space there between into which the rubber may flow. As spigot end 14 moves farther proximally in to bell end 10, it contacts surface 29 of lip portion 27 and causes the lip portion to pivot radially outward and press against rear radial wall 17 thereby increasing the sealing effectiveness of gasket 12 between the spigot and the bell.

Figure 2:
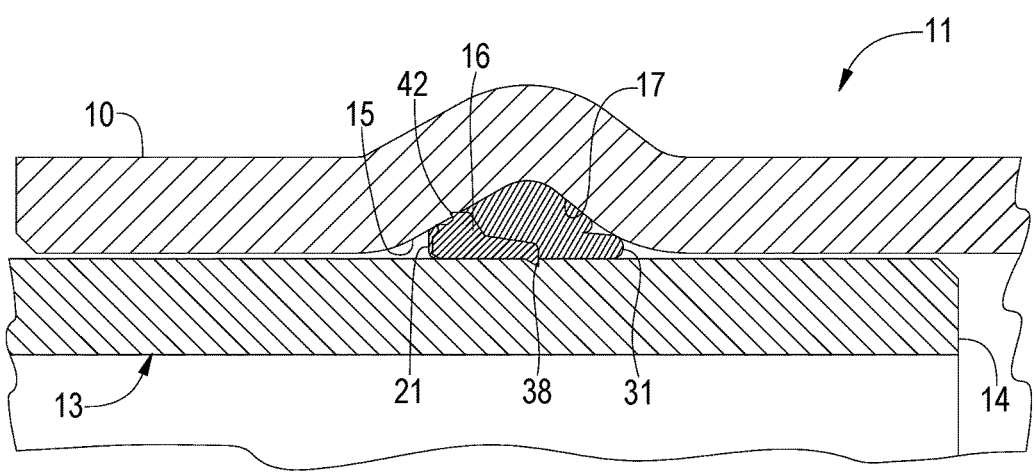
FIG. 2 is a fragmented sectional view of the bell end, the pipe gasket and the spigot of FIG. 1 showing the arrangement of the restraining segment following pressurization of, or the occurrence of thrust forces within, the interconnected pipes.

Referring to FIG. 2, upon pressurization of the pipe joint or the occurrence of thrust forces therein, spigot end 14 moves distally as the axial forces created by fluid pressurization attempt to force pipes 11 and 13 apart. This causes tooth 38 of each segment 16 to engage with spigot end 14 by friction or by penetrating non-destructively a short distance into spigot end 14. Each tooth 38 impinges upon spigot end 14 as pipe 13 moves distally since the proximal edge of each tooth 38 contacts pipe 13 at about a 90° angle. As pressure within the pipe joint is increased to normal operating pressures, segments 16 translate distally within pipe 13 towards front radial wall 15 causing teeth 42 to press through the rubber body and impinge upon front radial wall 15 of the annular retainer groove. The rubber compressed by the pressing of gasket 12 against front radial wall 15 and displaced by penetration of bell teeth 42 through the rubber is caused to flow into space 43. There is no direct segment interaction with space 43. Space 43 provides a void for the displaced rubber, which occurs during joint assembly, caused by gasket compression. Space 43 allows for improved contact between the segment teeth 42 and radial wall 15. The teeth can penetrate this rubber without the aid of gap 43 if the force is high enough, but gap 43 decreases the force required for engagement between the segment and wall 15. Further advancement of segments 16 distally is arrested by the engagement of bell teeth 42 with front radial wall 15 and engagement of each tooth 38 with spigot end 14. In this manner, segments 16 become wedged between bell end 10 and spigot end 14 and the axial forces generated by the pressurization of the pipes are transmitted axially between teeth 38 and rows of teeth 42 and radially to and between the pipes as segments 16 are urged distally. Further, by impinging teeth 42 into front radial wall 15, radial forces caused by the wedging of segments 16 between pipes 11 and 13 are countered.

As will be apparent to one skilled in the art, various modifications can be made within the scope of the aforesaid description. Such modifications being within the ability of one skilled in the art form a part of the present invention and are embraced by the claims below. For example, it is contemplated that the pipe gasket of the present can be used to form a restrained seal between a bell of a metal pipe and a spigot of a plastic pipe.

The invention claimed is:

1. A pipe gasket for restraining a spigot of a first pipe within a bell of a second pipe, the pipe gasket comprising:
   a compressible annular body, and
   a plurality of rigid segments partially embedded within the compressible annular body,
   wherein at least one rigid segment of the plurality of the rigid segments has an exposed surface defining a unitary spigot tooth and including opposing lateral edges, a proximal edge, a distal edge and a substantially flat portion that extends to and between the distal edge and the unitary spigot tooth,
   wherein the at least one rigid segment includes at least one bell tooth and the compressible annular body includes a void located in front of the at least one bell tooth.

2. The pipe gasket of claim 1 wherein the substantially flat portion extends to and between the opposing lateral edges.

3. The pipe gasket of claim 2 wherein the unitary spigot tooth extends along the proximal edge.

4. The pipe gasket of claim 1 wherein the unitary spigot tooth extends along the proximal edge.

5. A method of restraining the spigot of the first pipe within the bell of the second pipe comprising:
   seating the pipe gasket of claim 4 into the bell,
   inserting the spigot into the bell and through an opening defined by the compressible annular body whereby the spigot directly contacts and slides across the flat portion from about the distal edge to the unitary spigot tooth, and
   engaging the unitary spigot tooth with the spigot,
   wherein the first pipe and the second pipe are plastic.

6. A method of restraining the spigot of the first pipe within the bell of the second pipe comprising:
   removing a self-restrained gasket from an annular groove in the bell,
   seating the pipe gasket of claim 4 into the annular groove,
   inserting the spigot into the bell and through an opening defined by the compressible annular body,
   engaging the unitary spigot tooth with the spigot,
   wherein the first pipe and the second pipe are plastic.

7. A restrained pipe joint comprising the pipe gasket of claim 1 wherein the first pipe is a plastic pipe and the second pipe is selected from the group consisting of a metal pipe and another plastic pipe.

8. A method of restraining the spigot of the first pipe within the bell of the second pipe comprising:
   seating the pipe gasket of claim 1 into the bell,
   inserting the spigot into the bell and through an opening defined by the compressible annular body whereby the spigot directly contacts and slides across the flat portion from about the distal edge to the unitary spigot tooth, and
   engaging the unitary spigot tooth with the spigot,
   wherein the first pipe is plastic and the second pipe is metal.

9. A pipe gasket comprising:
   a ring fabricated from a compressible material, the ring having an inner annular surface and an outer annular outer surface,
   a void within the ring,
   a first opening extending through the inner annular surface and into the void, and
   a restraining segment seated within the void, the restraining segment including a spigot tooth extending radially inward from a proximal edge of the restraining segment and a flat portion extending distally from the unitary spigot tooth to a distal edge of the restraining segment,
   wherein the flat portion is essentially flush with the inner annular surface.

10. The pipe gasket of claim 9 including a second opening extending through the outer annular surface and into a second void.

11. The pipe gasket of claim 10 wherein the restraining segment includes at least one bell tooth located within or adjacent to the second void.

12. The pipe gasket of claim 9 wherein the flat portion extends to and between opposing lateral edges of the restraining segment.

13. A restrained pipe joint comprising;
a plastic first pipe having a spigot,
a second pipe having a bell, the second pipe being selected from the group consisting of a plastic pipe and a metal pipe, and
the pipe gasket of claim 9 operatively coupled between the bell and the spigot.

14. A method of restraining the spigot of the first pipe within the bell of the second pipe comprising:
seating the pipe gasket of claim 9 into the bell,
inserting the spigot into the bell and through an opening defined by the ring whereby the spigot directly contacts and slides across the flat portion before contacting the spigot tooth, and
engaging the spigot tooth with the spigot,
wherein the first pipe and the second pipe are plastic.

15. A pipe gasket for restraining a spigot of a first pipe within a bell of a second pipe, the pipe gasket comprising:
a compressible body having an inner annular surface and an outer annular outer surface,
a first opening in the inner annular surface, the first opening having opposing lateral edge portions, a proximal edge portion and a distal edge potion,
a restraining segment partially embedded within the compressible body, the restraining segment having a first face that extends to and between the opposing lateral edge portions and to and between the proximal edge portion and the distal edge portion of the first opening,
wherein the first face defines a spigot tooth extending along the proximal edge portion of the first opening and includes a substantially flat portion extending distally from the single spigot tooth to the distal edge portion of the first opening,
wherein the flat portion is substantially flush with the inner annular surface.

16. The pipe gasket of claim 15 wherein the flat portion extends to and between the opposing lateral edge portions of the first opening.

17. The pipe gasket of claim 15 wherein the restraining segment is a powered metal product.

18. A method of restraining the spigot of the first pipe within the bell of the second pipe comprising:
seating the pipe gasket of claim 15 into the bell,
inserting the spigot into the bell and through an opening defined by the compressible body whereby the spigot slides across the flat portion before contacting the spigot tooth, and
engaging the spigot tooth with the spigot,
wherein the first pipe and the second pipe are plastic.

19. A method of restraining the spigot of the first pipe within the bell of the second pipe comprising:
seating the pipe gasket of claim 15 into the bell,
inserting the spigot into the bell,
sliding the spigot across the spigot tooth whereby the compressible body is caused to flex at an annular trough formed within the outer annular surface of the compressible body, and
engaging the spigot tooth with the spigot,
wherein the first pipe and the second pipe are plastic.

20. A pipe gasket for restraining a spigot of a first pipe within a bell of a second pipe, the pipe gasket comprising:
a compressible body having an inner annular surface and an outer annular outer surface,
a first opening in the inner annular surface, the first opening having opposing lateral edge portions, a proximal edge portion and a distal edge potion,
a restraining segment partially embedded within the compressible body, the restraining segment having a first face that extends to and between the opposing lateral edge portions and to and between the proximal edge portion and the distal edge portion of the first opening,
wherein the first face defines a spigot tooth extending along the proximal edge portion of the first opening and includes a substantially flat portion extending distally from the single spigot tooth to the distal edge portion of the first opening, and
wherein the restraining segment includes a pair of bell teeth.

21. The pipe gasket of claim 20 including a second opening in the outer annular surface located in front of the pair of bell teeth.

* * * * *